United States Patent [19]

Johnstone et al.

[11] Patent Number: 4,885,474
[45] Date of Patent: Dec. 5, 1989

[54] CONNECTOR ASSEMBLY FOR PLUG-IN ENERGIZATION AND BATTERY ACTIVATION OF AN ASSOCIATED ELECTRICAL APPARATUS

[75] Inventors: Robert M. Johnstone, Fairfield; Joseph S. Wegrzyn, Stratford, both of Conn.

[73] Assignee: Dual Lite, Inc., Newtown, Conn.

[21] Appl. No.: 323,673

[22] Filed: Mar. 15, 1989

[51] Int. Cl.$^4$ .............................................. H02J 7/00
[52] U.S. Cl. ...................................... 307/66; 307/150
[58] Field of Search .................. 307/66, 64, 149, 150; 315/86

[56] References Cited

U.S. PATENT DOCUMENTS

| | | | |
|---|---|---|---|
| 3,356,891 | 12/1967 | Godard | 315/86 |
| 3,390,307 | 6/1968 | Paddison et al. | 307/66 X |
| 3,596,106 | 7/1971 | Raddi | 307/66 |
| 3,599,073 | 8/1971 | Wilson | 307/66 X |
| 3,675,038 | 7/1972 | Dyer | 307/66 |
| 3,836,815 | 9/1974 | Herzug | 315/86 |
| 4,044,268 | 8/1977 | Hammel et al. | 307/66 |
| 4,056,757 | 11/1977 | Mauch | 315/86 |
| 4,144,462 | 3/1979 | Sieron et al. | 307/66 |
| 4,209,710 | 6/1980 | Quarton | 307/66 |
| 4,355,479 | 10/1982 | Thornton | 40/570 |
| 4,398,098 | 8/1983 | Minchey | 307/140 |
| 4,410,835 | 10/1983 | Zabroski | 315/87 |

FOREIGN PATENT DOCUMENTS 2602028 1/1988 France .
2194033 2/1988 United Kingdom .
2203001 10/1988 United Kingdom .

OTHER PUBLICATIONS

Ten-page undated Beghelli brochure received May 16, 1989, showing Practica Emergency Lighting Units, Beghelli, Inc., Jacksonville, Fla.

Primary Examiner—William M. Shoop, Jr.
Assistant Examiner—Sharon D. Logan
Attorney, Agent, or Firm—Mattern, Ware, Stoltz & Fressola

[57] ABSTRACT

An emergency lighting fixture, for plug-in installation in a wall connector mounted protruding from a fixed wall plate, has a back plate secured to its wall-engaging face. The back plate and the wall plate are provided with interfitting flanges and a pivoted latch secures the plates together in facing juxtaposed engagement. A mating multi-prong plug and socket connects A.C. line power from the wall connector to internal circuitry in the lighting fixture for lighting a lamp, for charging a rechargeable internal battery and for operating a transfer circuit to deliver battery power in the event of line power failure. The conductor from one terminal of the battery is connected to said circuitry by two prong-and-socket pairs, in the multi-prong plug and socket, which are connected by a permanent jumper conductor in the wall connector, affording battery isolation in the lighting fixture until its plug-in installation in the wall connector is completed.

14 Claims, 4 Drawing Sheets

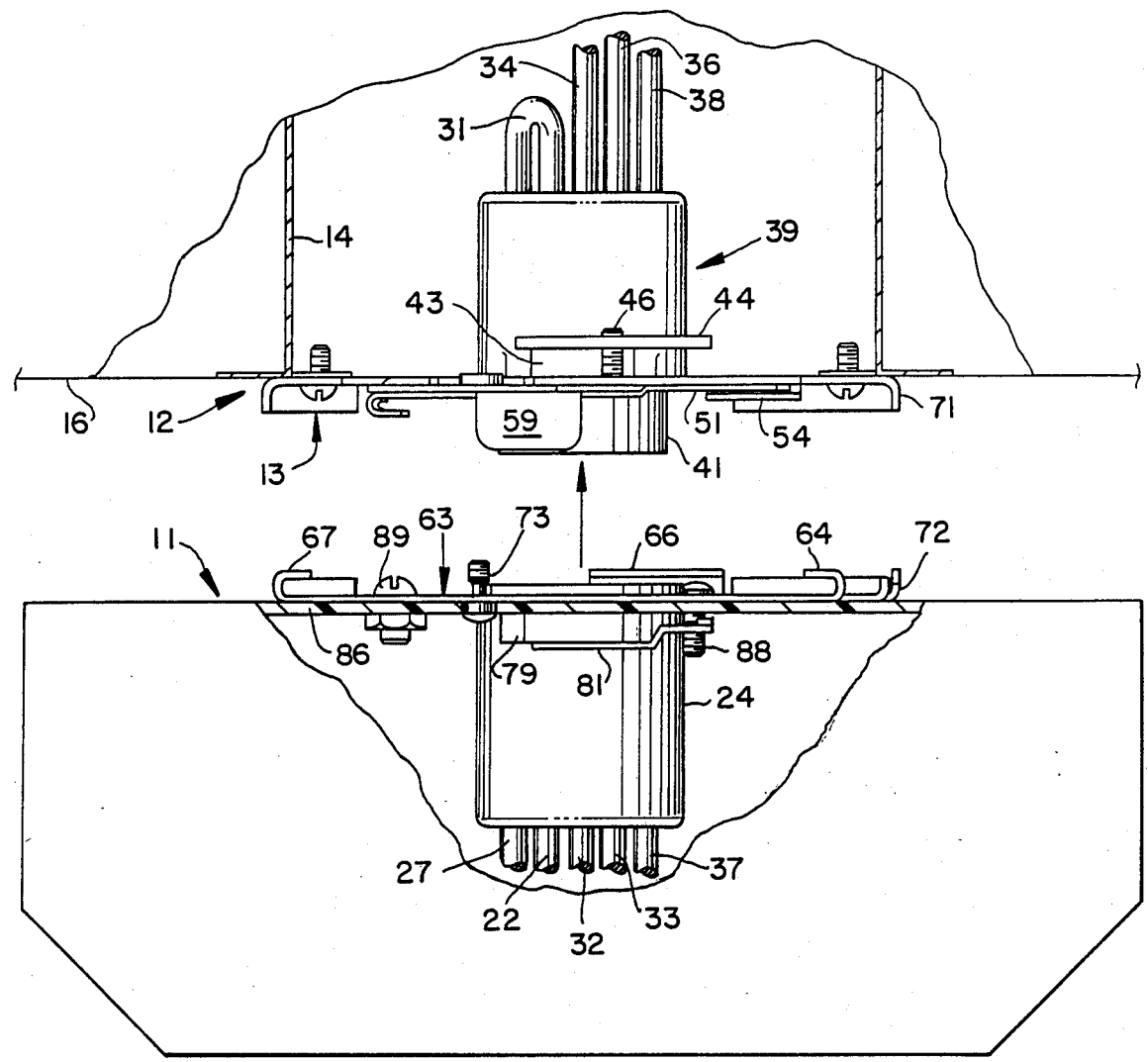
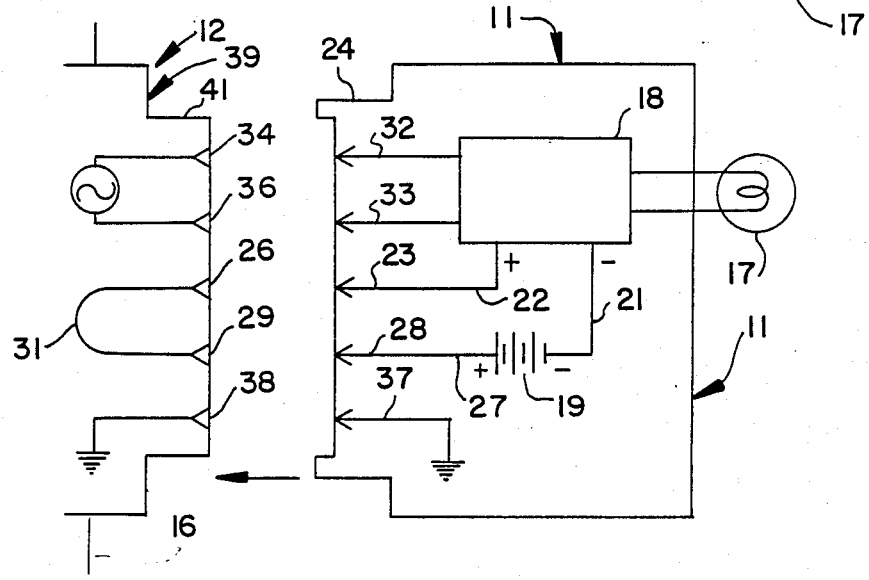

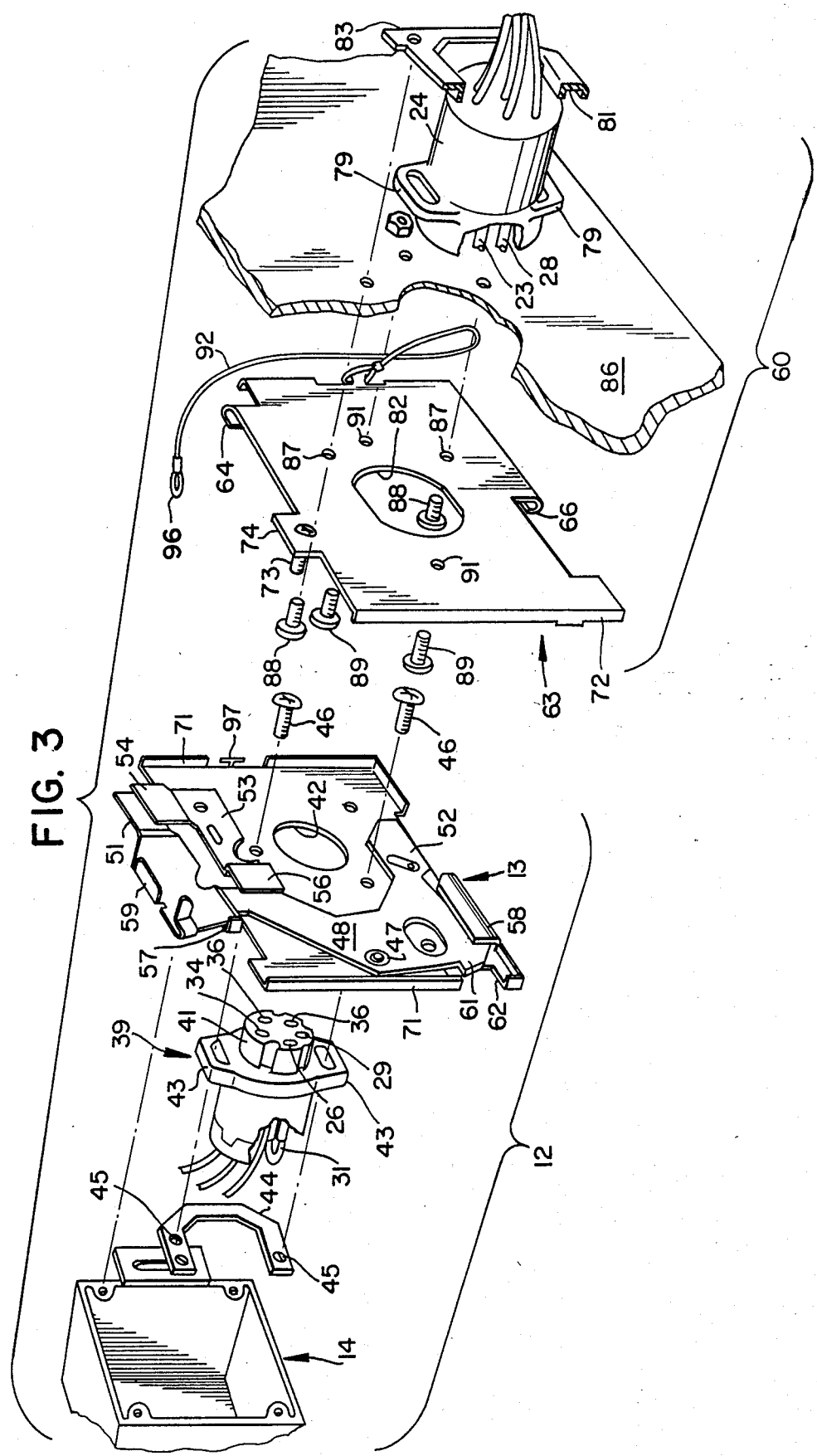

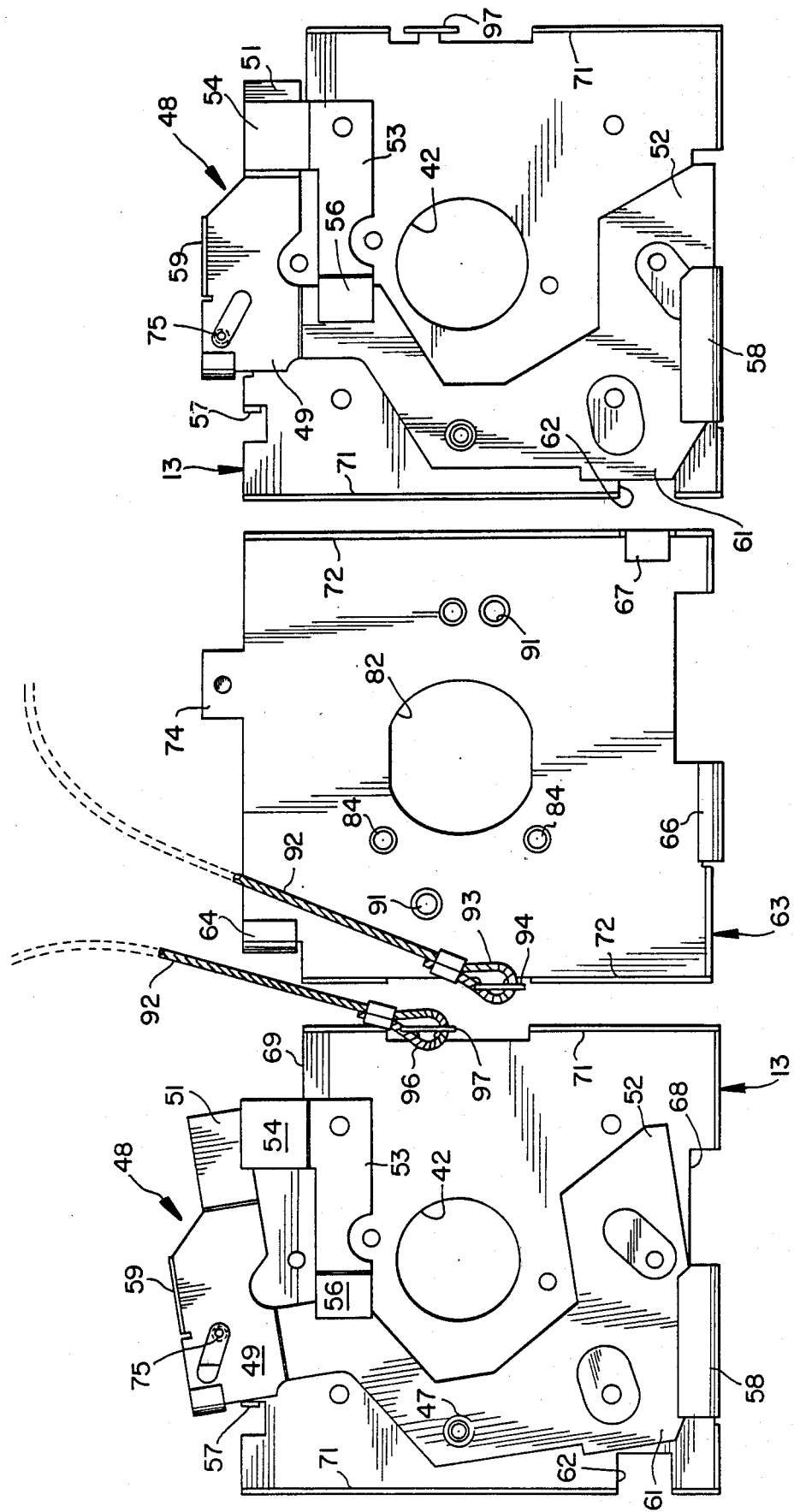

CONNECTOR ASSEMBLY FOR PLUG-IN ENERGIZATION AND BATTERY ACTIVATION OF AN ASSOCIATED ELECTRICAL APPARATUS

This invention relates to emergency lighting fixtures such as battery powered exit signs and spotlights for illuminating passageways leading to exits, and more particularly, to power line connectors permanently wired into wall or ceiling junction boxes and adapted for convenient plug-in installation of emergency lighting fixtures. These fixtures incorporate features avoiding inadvertent dropping of the fixture during installation and providing isolation of the battery from the transfer and charging circuitry until the fixture is installed, with automatic battery connections established by the plug-in installation of the fixture in the power line connector installed in the wall or ceiling junction box.

Emergency lighting fixtures such as exit signs and spotlights customarily incorporate battery power such as rechargeable Ni-cad batteries connected through a transfer circuit, to provide electrical power assuring that the fixture will provide illumination and identify exits and passageways in the event of line power failures. Such batteries are comparatively heavy in weight, and the fixtures require careful handling by the installer to avoid dropping and breaking them during installation. Electrical wiring connections must be made while the heavy fixture is held or balanced precariously, often at a high level above the floor.

In addition, during storage prior to installation, the rechargeable batteries should preferably be disconnected and isolated from the remaining circuitry, requiring the installer to remember to turn a switch connecting the battery at the time of installation. These requirements add to the labor costs of installing emergency lighting fixtures, often compelling a licensed electrician to spend considerable time in the installation of each emergency lighting fixture in turn throughout a new building.

The permanently wired line connectors and emergency lighting fixtures of the present invention are adapted for plug-in installation by a mating pair of apertured and flanged plates, a wall plate presenting the line connector for plug-in installation of the lighting fixture, and a back plate mounted on the wall side of the lighting fixture with flanges allowing it to be engaged with and latched to the wall plate and permanently secured in position, with the lighting fixture in plugged-in engagement.

Battery wiring connections between the rechargeable battery and the transfer circuitry are made through a pair of jumpered prongs and sockets in the plug-in connectors, thus requiring plug-in installation of the emergency lighting fixture in order to connect the battery to the remaining circuitry. When the lighting fixture is in storage or transit, its rechargeable battery is totally isolated from the remaining circuitry in the lighting fixture. The circuit is completed only upon plug-in installation of the fixture in the line connector.

In addition, a small diameter stranded wire cable lanyard with eye loops at each end has one eye loop installed on a flange cleat on the back plate of the lighting fixture. As the fixture is readied for installation, the eye loop at the other end of this short lanyard cable is engaged with a similar flange cleat on the wall plate assuring that the comparatively heavy lighting fixture will be retained, physically secured to the junction box by the lanyard cable, in the event the installer should happen to release his grip. A pivoting latch mechanism on the wall plate engages suitable returned flanges on the back plate, securing the two plates together after plug-in insertion of the fixture connector in the line connector presented by the wall plate.

Accordingly, a principal object of the present invention is to provide plug-in line connector assemblies and emergency lighting fixture units designed for plug-in connection and permanent mounting installation by unskilled personnel after the line connectors have been permanently installed by licensed electricians throughout a floor or a building during construction.

Another object of the invention is to provide plug-in emergency lighting fixtures in which rechargeable battery components are automatically isolated from remaining circuitry from the time of manufacture and testing through all storage and shipping until the plug-in emergency lighting fixture is permanently installed in its operating location.

A further object of the invention is to provide mating plate means mounted on a building wall or ceiling and on the unexposed face of an emergency lighting fixture, providing for plug-in insertion of the emergency lighting fixture in a permanently wired line connector protruding from the building wall or ceiling surface, and secure anchoring of the fixture in its installed location.

Another object of the invention is to provide such plug-in emergency lighting fixtures having retaining means latching, securely anchoring and locking the emergency lighting fixture in its installed position.

Still another object of the invention is to provide such plug-in emergency lighting fixtures with temporary retention cable means securing the fixture near its permanent location while plug-in installation is being completed.

Other objects of the invention will in part be obvious and will in part appear hereinafter.

The invention accordingly comprises the features of construction, combinations of elements, and arrangements of parts which will be exemplified in the construction hereinafter set forth, and the scope of the invention will be indicated in the claims.

For a fuller understanding of the nature and objects of the invention, reference should be made to the following detailed description taken in connection with the accompanying drawings.

THE DRAWINGS

FIG. 1 is a schematic top plan view, partially cut away, showing an emergency lighting fixture positioned ready for plug-in insertion in a line connector permanently mounted in a junction box in a wall or ceiling of a building.

FIG. 2 is a schematic circuit diagram of the two engageable and disengageable portions of the devices of the present invention, the permanent line connector mounted in a junction box and the plug-in insertable emergency lighting fixture, showing the connections made when the fixture is inserted in the line connector.

FIG. 3 is an exploded perspective view of the interfitting components assembled to form the two engageable and disengageable subassemblies of the present invention.

FIG. 4 is a front elevation view showing the wall plate, ready to be installed covering the face of the junction box and presenting the line connector for engagement, and with its pivoting latch in its unlatched position.

FIG. 5 is a rear elevation view showing the exposed face of the back plate which is ready for mounting on the wall-engaging surface of the emergency lighting fixture, ready for engagement with the wall plate shown in FIG. 4.

FIG. 6 is a front elevation view of the wall plate of FIG. 4 with its pivoting latch arm moved to its latched position.

BEST MODE FOR CARRYING OUT THE INVENTION

Figure 7:
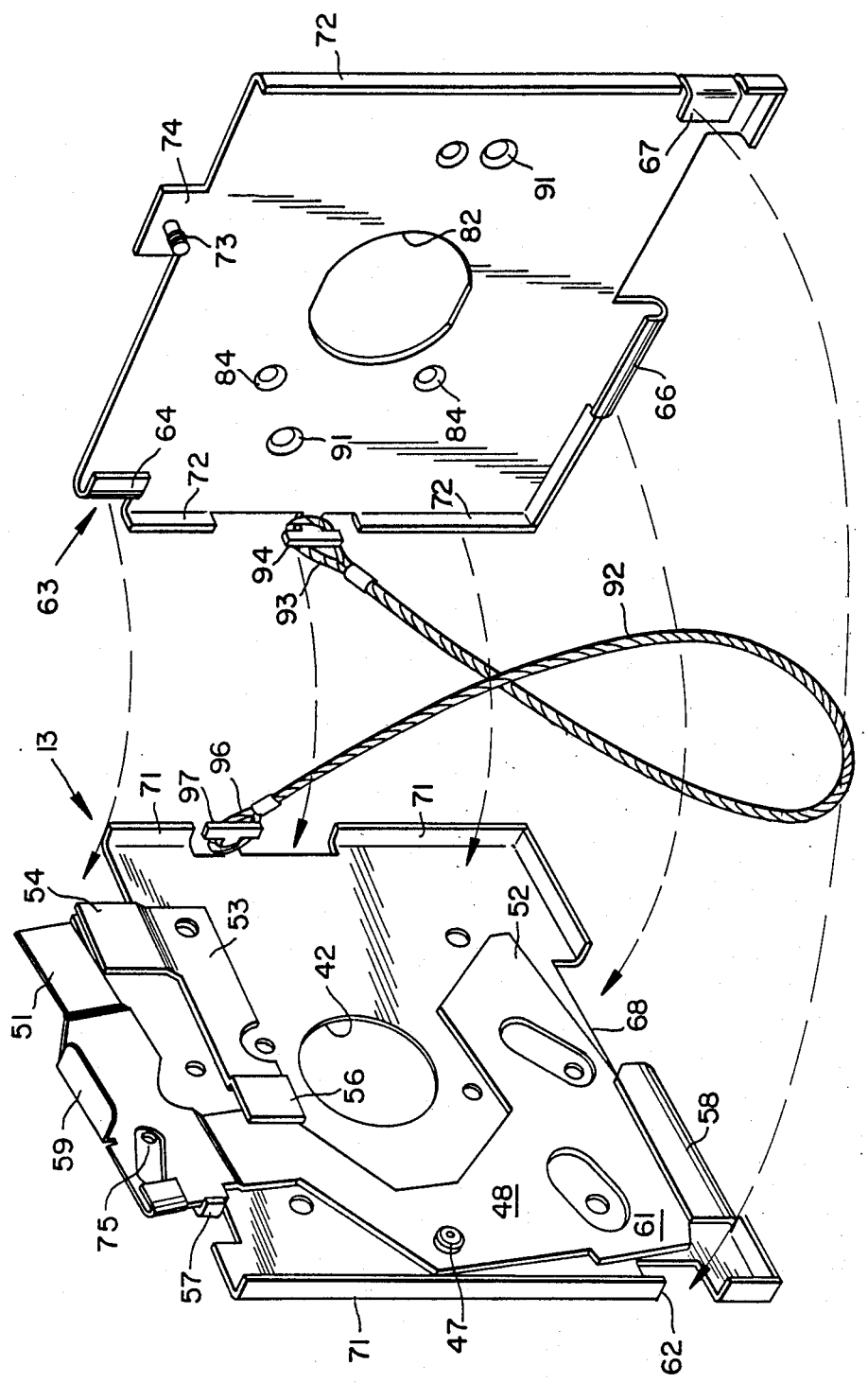
FIG. 7 is a perspective view of the wall plate of FIG. 4 and the back plate of FIG. 5 shown facing the viewer and ready for latching engagement with each other.

The two engageable and disengageable assemblies of the present invention are shown in the schematic top plan view of FIG. 1. In this figure, the emergency lighting fixture 11 is viewed from above with its upper housing wall cut away to expose internal construction details. Fixture 11 is presented ready for plug-in engagement, with the line connector 12 mounted on wall plate 13, and anchored thereby to junction box 14 recessed in building wall 16, on which the fixture 11 is to be permanently mounted and displayed to view, thus providing an illuminated sign or spotlight guiding the viewer toward exits in the building in the event of power failure or providing emergency illumination until power is restored.

The schematic circuit diagram of FIG. 2 shows the line connector 12 protruding slightly from wall 16, and the disengageable emergency lighting fixture 11 is positioned ready for plug-in insertion in the line connector 12.

As shown in FIG. 2, fixture 11 is provided with a lamp 17 connected to circuitry 18 including a battery charger circuit and a transfer circuit for connecting the charged battery to lamp 17 in the event of failure of line power delivered to line connector 12. A charger circuit of circuitry 18 is connected to battery 19 through one conductor 21 connected to the negative battery terminal and by way of a positive conductor 22 connected to a positive prong 23 in the plug-in connector 24 on the wall-engaging face of fixture 11, engageable in a socket 26 in line connector 12. The positive terminal of battery 19 is also connected via a conductor 27 to a different prong 28 of plug-in fixture connector 24, engageable with a socket 29 in line connector 12.

Sockets 26 and 29 are connected by a permanent jumper conductor 31, assuring that the positive terminal of battery 19 will be connected to conductor 22 and circuitry 18 when the plug-in fixture connector 24 is engaged in line connector 12, and likewise assuring that battery 19 will be disconnected from circuitry 18, and always totally isolated therefrom, when fixture 11 is disengaged from line connector 12.

AC power is supplied to the battery charger components and the transfer circuit components of circuitry 18 via two additional prongs 32 and 33 of fixture connector 24, connected across the power line by sockets 34 and 36 in line connector 12, as shown in FIG. 2. A ground prong 37 of fixture connector 24 is connected to a ground socket 38 in line connector 12, assuring that the fixture ground is connected to the system ground when the fixture is engaged in operating position.

The various components assembled to form the permanently installed line connector 12 and the mating fixture connector assembly 60, and the mechanical parts employed to assure the latching engagement of the fixture 11 in the line connector 12 and its permanent mounting on the building wall, are all illustrated in FIG. 3. The insulated male plug 39 providing the electrical connections in the line connector 12 is provided with five recessed sockets 26, 29, 34, 36 and 38, exposed through the protruding outer end 41 extending through a mating aperture 42 in wall plate 13, a generally rectangular plate apertured for screw mounting to the junction box 14.

Slotted flanges 43 in male plug 39 contact the rear face of wall plate 13 inside junction box 14 and a U-shaped nut yoke 44 with aligned threaded apertures 45 is mounted in abutting engagement on the inside or rear face of flanges 43. Clamping screws 46 extending through aligned holes in wall plate 13 and the slots of slotted flanges 43 engage the threaded apertures 45 of the nut yoke 44 to clamp plug 39 solidly to the rear face of wall plate 13, with its outer end 41 protruding through aperture 42.

As illustrated in FIG. 1, when wall plate 13 is mounted on junction box 14, as shown schematically in FIGURE 1, only the protruding outer end 41 and wall plate 13 are exposed to view.

Wall Plate Latch Mechanism

Mounted on a pivot grommet 47 on one side of wall plate 13 is a pivoted latch 48 having an upper shoulder 49, near the upper corner of wall plate 13, a latching arm 51 opposite grommet 47, and a latching foot 52 near the lower central portion of wall plate 13.

Wall plate 13 is provided with several guide flanges limiting the pivoting motion of pivoted latch 48. These flanges include an L-shaped guide flange 53 having a central portion spot welded to the face of wall plate 13 and two outwardly offset terminal portions 54 and 56 respectively overlapping latching arm 51 and the central portion of pivoted latch 48, and blocking further pivoting motion of latch 48 in a clockwise direction beyond the latched position shown in FIG. 6. In addition, a projecting ear 57 extending forward from wall plate 13 prevents excessive counterclockwise pivoting motion of shoulder 49, as clearly shown in FIG. 4. Finally, an upturned guide flange 58 formed along a portion of the lower end of wall plate 13 overlaps the lower portion of pivoted latch 48, assuring that its foot 52 will not pivot clockwise beyond the latched position shown in FIG. 6.

The flange 53 terminal portions 54 and 56 and the upturned lower flange 58 all serve to constrain pivoted latch 48 within its plane of pivoting movement, and prevent it from being caught, snagged, bent, or deformed from its preferred flat planar shape as illustrated in the drawings.

An outwardly protruding shelf flange 59 extending forward away from the junction box 14 at the upper end of pivoted latch 48 provides a finger grip or handle by which the user can pivot latch 48 between its two limit positions shown in FIGS. 4 and 6.

In addition to arm 51 and foot 52 of pivoting latch 48, a heel projection 61 shown in the lower left portion of FIGS. 4 and 6 protrudes into a notched recess 2 formed in wall plate 13 in the latched position of pivot latch 48 shown in FIG. 6, and swings counterclockwise about grommet 47 away from juxtaposition with notch 62 in the unlatched position of pivot latch 48 shown in FIG. 4.

Back plate

Mounted on the wall facing surface of fixture 11 to be presented for engagement and disengagement with wall plate 13 is a back plate 63 best seen in FIGS. 3 and 5, and shown ready for engagement in FIG. 7. Three reverse returned flanges protruding from the edges of back plate 63 and thence extending inward, slightly overlapping the exposed rear face of back plate 63 are positioned for engagement with latch 48 in its latched position shown in FIG. 6. These reverse returned flanges are best shown in FIG. 5 and they include an upper arm flange 64 for engagement with the arm 51, a foot flange 66 for engagement with foot 52 and a heel flange 67 for engagement with heel projection 61.

Thus, when wall plate 63 as shown in FIGS. 3 and 5 is maneuvered into facing engagement with back plate 13, these inwardly turned flanges 64, 66, and 67 extend past the plane in which pivot latch 48 moves in its angular motion between its unlatched position of FIG. 4 and its latched position of FIG. 6. For this reason, the projections 51, 52, and 61 of pivot latch 48 are retracted to clear all three inturned flanges in the unlatched position shown in FIG. 4, and to swing clockwise into latching engagement with all three flanges 64, 66 and 67 when pivot latch 48 moves to its latched position shown in FIG. 6.

Wall plate 13 is provided with notched cutaways, such as notched recess 62, to accommodate each of these flanges, as can be observed in FIG. 4. Thus notch 62 receives flange 67; notch 68 receives flange 66, and the cutaway corner 69 shown in the upper right-hand portion of FIG. 4 receives flange 64. Back plate 63 is thus dimensioned with the three flanges 64, 66 and 67 spaced from the body of back plate 63 by a dimension closely approximating the depth of the side edge flanges 71, on wall plate 13, and 72 on back plate 63, placing return flanges 64, 66 and 67 approximately in the plane of the body of wall plate 13, behind the plane of movement of pivot latch 48. A comparison of FIGS. 4 and 5 discloses that side edge flanges 72 of back plate 63 are slightly closer together than the side edge flanges 71 of wall plate 13, allowing flanges 72 to fit between wall plate edge flanges 71 when the back plate is maneuvered into engagement with the wall plate.

Supplementing the latching of pivot latch 48 with the returned flanges 64, 66 and 67 of back plate 63 is a locking screw 73 preferably captive in an apertured top flange 74 protruding upward from back plate 63 and positioned for engagement with a threaded hole 75 formed in an aligned top flange portion of wall plate 13 as clearly shown in FIGS. 4 and 6. When locking screw 73, best seen in FIG. 3 is advanced into threaded hole 75 the wall plate and the light fixture 11 are firmly anchored in latched engagement with the wall plate 13.

Referring to FIG. 3, the manner of assembly of plug-in connector 24 of fixture 11 with wall plate 63 is shown in the exploded perspective view of FIG. 3 and in the view of these components assembled and aligned for engagement in FIG. 1. Plug-in connector 24 is provided with protruding male prongs 23 and 28 engaging sockets 26 and 29 connected by jumper conductor 31. A.C. line voltage is delivered to the transfer and charging circuitry 18 by prong-and-socket pairs 32–34 and 33–36. Fixture ground is connected to the building's power line ground by prong-and-socket pairs 37–38.

These prongs are all illustrated schematically in FIG. 2, and the two jumper prongs 23 and 28 are clearly shown at the right-hand side of FIG. 3 where fixture connector 24 has its protruding end cut away to reveal these prongs. Slotted mounting flanges 79 similar to flanges 43 of male plug 39 extend radially from the outer walls of plug-in connector 24 and a flanged nut bracket 81 shown at the right-hand side of FIG. 3, somewhat comparable to nut yoke 44, cooperates with the mounting flanges 79 to position plug-in connector 24 securely protruding through a central aperture 82 in back plate 63.

Nut bracket 81 is generally C-shaped in configuration, with a central portion positioned beside plug-in connector 24, and it has two threaded corner holes 83 aligned with larger holes 84 formed in a rear wall 86 of lighting fixture 11, which are also aligned with anchoring holes 87 formed in back plate 63. Screws 88 inserted from the rear side of back plate 63 and extending through holes 87 and 84 into threaded engagement with holes 83 in bracket 81 draw the nut bracket firmly rearward, clamping mounting flanges 79 firmly against the inside face of rear wall 86 of light fixture 11 and drawing the light fixture itself into firm anchored engagement with back plate 63, forming an integral assembly illustrated in the cutaway lower portion of FIG. 1.

As also shown in FIG. 1, additional fastenings 89 such as nuts and bolts may be employed to further secure back plate 63 to the rear face of rear wall 86 of light fixture 11 if desired In fact, holes 91 formed in these two components are shown in FIG. 3 positioned to perform this supplemental anchoring attachment of back plate 63 and rear wall 86.

Lanyard 92

As shown in FIGS. 3, 4 and 5, back plate 63 preferably carries a lanyard 92, preferably of small diameter stainless steel cable with eye loops formed in each end. A back plate eye loop 93 is secured to a protruding horned cleat 94 formed in an open space in the side flange 72 of back plate 63, and a wall plate eye loop 96 is engaged over a horned cleat 97 in the corresponding portion of side flange 71 of the wall plate in FIG. 4, well clear of all portions of the pivot latch 48, as illustrated in FIGS. 3, 4, 5 and 7. Lanyard 92 is normally installed with its back plate eye loop 93 secured to cleat 94 on the back plate 63 and is delivered to the customer for installation assembled in this position. The wall plate eye loop 96 of lanyard 92 is thus disengaged and free, but is ready for engagement on cleat 97 of wall plate 13 during the installation of fixture 11.

Lanyard 92 is thus the first component part of light fixture 11 which is engaged with wall plate 13, and when this engagement of its eye loop 96 over cleat 97 is completed, the entire weight of light fixture 11 may hang from lanyard 92 and may be suspended there indefinitely if it is left by the installer or inadvertently released during the installation procedure. This avoids any risk of breakage or damage to the wall fixture 11 immediately upon securing of lanyard 92 to wall plate 13.

The lanyard 92 is normally drawn away from the facing portions of back plate 63 and wall plate 13 to assure that it will not be caught between them and will not interfere with the latching engagement of these two plates during the installation procedure.

Once installation has been completed, both prongs of both cleats 94 and 97 are exposed on the right hand side of the assembled and latched plates and if desired, lanyard 92 may be unhooked and removed from the assembled installation. If not removed, lanyard 92 is normally concealed behind fixture 11 in its mounted position.

The foregoing description of the component parts and their cooperating engagement assumes that fixture 11 is being mounted on a wall, with junction box 14 being recessed into the wall and presenting wall plate 13 at the wall surface ready to receive back plate 63 for mounting fixture 11 thereon. The fixture 11 may, if desired, be mounted on a ceiling, in which case junction box 14 is recessed into the ceiling and the various parts are all simply rotated 90 degrees for engagement of the light fixture 11 on the ceiling. The positive latching engagement of back plate 63 on wall plate 13 operates regardless of the orientation of these two components and lanyard 92 likewise functions in a similar manner whether the fixture 11 is mounted on a ceiling or on a wall.

Accordingly, the objects set out above are achieved with efficiency and economy by the assembly of component parts described. In particular, the isolation of battery 19 inside light fixture 11 until conductors 22 and 27 are connected through prong and socket pairs 23–26 and 28–29 by way of jumper 31 inside junction box 14 assures that battery 19 remains disconnected from all other circuitry until mounting engagement, latching and locking of light fixture 11 on wall plate 13 is completed.

Firm latching engagement of light fixture 11 to wall plate 13 is achieved instantly by counterclockwise maneuvering of latch 48 to its latched position shown in FIG. 6 with its various portions securing inturned flanges 64, 66 and 67 of back plate 63 against removal.

Locked anchoring of light fixture 11 on wall plate 13 is finally achieved by the insertion and tightening of locking screw 73 through top flange 74 into threaded hole 75 in wall plate 13.

Thus light fixture 11 is immediately suspended against inadvertent dropping by lanyard 92, securely latched by pivoted latch 48, and locked by locking screw 73, and the engagement of the plug and socket connectors 24 and 39 during installation automatically terminates the isolation of battery 19 connecting it to the circuitry 18 for the first time and placing light fixture 11 fully in condition for operation automatically upon its mounting installation on wall plate 13.

It will thus be seen that the objects set forth above and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A wall-mounted battery-powered emergency lighting fixture for plug-in installation in a wall connector presented by a wall-mounted junction box comprising
    a wall plate mounted on the junction box incorporating first aperture means through which a first multi-terminal connector protrudes in clamped position,
    a back plate, dimensioned for facing mated juxtaposition with said wall plate, mounted on the emergency lighting fixture, incorporating second aperture means through which a second multi-terminal connector is presented for mating plug-and-socket engagement with the first multi-terminal connector,
    latch means operatively mounted between said plates for releasable latching engagement therebetween when said two plates are in mated juxtaposition,
    a re-chargeable electrical storage battery mounted in said lighting fixture,
    electrical circuitry in said fixture incorporating a battery re-charging circuit and a transfer circuit for connecting the re-chargeable battery to a lamp for operation during a failure of line power,
    conductor means in said lighting fixture connecting one terminal of the re-chargeable storage battery to one terminal of said electrical circuitry by way of two prongs and mating sockets in said multi-terminal connectors, and
    a jumper conductor positioned within the junction box joining the two prongs and mating sockets,
    providing a permanent connection of the battery terminal with the electrical circuitry terminal when the multi-terminal connectors are in mating plug-and-socket engagement, and isolating the battery terminal from the electrical circuitry terminal whenever the multi-terminal connectors are disengaged.

2. A wall-mounted battery-powered emergency lighting fixture for plug-in installation in a wall connector presented by a wall-mounted junction box comprising
    a wall plate mounted on the junction box incorporating first central aperture means through which a first multi-terminal connector protrudes in clamped position,
    a back plate, dimensioned for facing mated juxtaposition with said wall plate, mounted on the emergency lighting fixture, incorporating second central aperture means through which a second multi-terminal connector is presented for mating plug-and-socket engagement with the first multi-terminal connector,
    latching returned flange means protruding from one said plate toward the other said plate,
    latch means movably mounted on said other plate for releasable latching engagement with the returned flange means when said two plates are in mated juxtaposition,
    a re-chargeable electrical storage battery mounted in said lighting fixture,
    conductor means in said lighting fixture connecting one terminal of the re-chargeable storage battery to one terminal of said electrical circuitry by way of two prong and socket pairs in said multi-terminal connectors, and
    a jumper conductor positioned within the junction box joining the two prong- and-socket pairs,
    providing a permanent connection of the battery terminal with the electrical circuitry terminal when the multi-terminal connectors are in mating plug-and-socket engagement, and isolating the battery terminal from the electrical circuitry terminal whenever the multi-terminal connectors are disengaged.

3. A wall-mounted emergency lighting fixture for plug-in installation in a wall connector presented by a wall-mounted junction box comprising
    a wall plate mounted on the junction box incorporating first central aperture means through which a first multi-terminal connector protrudes in clamped position, a back plate, dimensioned for facing mated juxtaposition with said wall plate, mounted on the emergency lighting fixture, incorporating central aperture means through which a second multi-terminal connector is presented for mating plug-and-socket engagement with the first multi-terminal connector, latching returned flange means protruding from one said plate toward the other said plate, flange-accommodating recess means formed in said other plate embracing said latching returned flange means, latch means movably mounted on said other plate for releasable latching engagement with the returned flange means when said two plates are in mated juxtaposition, a re-chargeable electrical storage battery mounted in said lighting fixture, conductor means in said lighting fixture connecting one terminal of the re-chargeable storage battery to one terminal of a lamp circuit by way of two prong and socket pairs in said multi-terminal connectors, and a jumper conductor positioned within the junction box joining the two prong- and-socket pairs, providing a permanent connection of the battery terminal with the electrical circuitry terminal when the multi-terminal connectors are in mating plug-and-socket engagement, and isolating the battery terminal from the electrical circuitry terminal whenever the multi-terminal connectors are disengaged.

4. The wall mounted emergency lighting fixture defined in claim 1 wherein the lighting fixture also contains a battery-recharging circuit and a transfer circuit for connecting the battery to illuminate the lamp whenever line power fails.

5. The lighting fixture defined in claim 1, further including locking means clamping said two plates together in latching engagement.

6. The lighting fixture defined in claim 1, further including suspending means attached to the fixture and releasably attached to the wall plate, whereby the fixture is held near the wall plate while the plug-in installation is completed.

7. The fixture defined in claim 6 wherein the suspending means is a flexible stranded cable having a first eye loop secured to the back plate, and having a second eye loop releasably securable to the wall plate.

8. The fixture defined in claim 3 wherein the returned flange means includes at least two separate flanges spaced apart around the extreme ends of the latch means.

9. The fixture defined in claim 3 wherein the returned flange means includes at least three separate flanges spaced apart about said latch means.

10. A connector assembly for removable interconnection of an electrical apparatus with a source of electrical power presented at a junction box containing electrical power conductors, the connector assembly also for electrically connecting a battery within the electrical apparatus to battery charging and transfer circuitry forming part of the electrical apparatus, comprising;

(A) a wall plate having first means for mounting to the junction box and second means for releasable engagement with a back plate of the connector assembly, the wall plate having a first aperture formed therein;

(B) a first multi-terminal connector positioned within the wall plate first aperture, the first connector having a plurality of terminals for mating engagement with other terminals,
a first subset of the first connector terminals comprising at least two terminals electrically connected to each other,
a second subset of the first connector terminals having means for connection to the electrical power conductors within the junction box;

(C) a back plate having first means for mounting to the electrical apparatus, the back plate having second means for releasable engagement with the wall plate second means, the back plate further having a second aperture formed therein;

(D) a second multi-terminal connector positioned within the back plate second aperture, the second connector having a plurality of terminals for mating engagement with the plurality of terminals of the first connector when the back plate is engaged with the wall plate, a first subset of the second connector terminals having means for connection to the battery and the battery charging and transfer circuitry of the electrical apparatus so as to electrically isolate the battery from the battery charging and transfer circuitry of the electrical apparatus when the back plate is not engaged with the wall plate, and a second subset of the second connector terminals having means for connection to the electrical apparatus so as to provide electrical power thereto when the back plate is engaged with the wall plate, the second connector first and second subsets of terminals being aligned respectively for engagement with the first connector first and second subsets of terminals when the back plate is engaged with the wall plate; whereby the first subset of terminals of the first and second connectors electrically connect the battery to the battery charging and transfer circuitry of the electrical apparatus only when the back plate is engaged with the wall plate, and further whereby electrical power is presented to the electrical apparatus only when the back plate is engaged with the wall plate.

11. The connector assembly defined in claim 10 wherein the wall plate second releasable engagement means comprises a latch pivotally mounted to the wall plate for angular movement between a latched position and an unlatched position, and having at least two free ends, and wherein the back plate second means includes returned flange means engageable by said two free ends in the latched position of said latch.

12. The connector assembly defined in claim 10, wherein said back plate releasable engagement means includes a captive locking screw engageable with threaded hole means in said wall plate.

13. The connector assembly defined in claim 10, further including suspending means attached to the back plate and releasably attachable to the wall plate, whereby the apparatus is held near the wall plate while the engagement of the back plate and the wall plate is 14. The connector assembly defined in claim 13 wherein the suspending means is a flexible stranded cable having a first eye loop secured to the black plate, and having a second eye loop releasably securable to the wall plate.

* * * * *

UNITED STATES PATENT AND TRADEMARK OFFICE
CERTIFICATE OF CORRECTION

PATENT NO. : 4,885,474

DATED : December 5, 1989

INVENTOR(S) : Robert M. Johnstone and Joseph S. Wegrzyn

It is certified that error appears in the above—identified patent and that said Letters Patent is hereby corrected as shown below:

Column 10, line 62, after "is", please add --completed.--

Signed and Sealed this

Thirtieth Day of October, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,985,474  PAGE 1 of 2
DATED : January 15, 1991
INVENTOR(S) : OGITANI et al It is certified that error appears in the above-identified patent and that said Letters Patent is hereby corrected as shown below:

IN THE ABSTRACT:

Line 9, "Y-CO-O-(A-O)$_n$CO-CR=CH$_2$" should read --Y-CO-O-(-A-O-)$_n$CO-CR=CH$_2$--.

Col. 1, line 24, "alkalisoluble" should read --alkali-soluble--.

Col. 6, line 58, "butyl14-cresol" should read --butyl-4-cresol--; and line 59, "tertbutylcatechol" should read --tert-butylcatechol--.

UNITED STATES PATENT AND TRADEMARK OFFICE
CERTIFICATE OF CORRECTION

PATENT NO. : 4,985,474

DATED : January 15, 1991

INVENTOR(S) : OGITANI et al

It is certified that error appears in the above-identified patent and that said Letters Patent is hereby corrected as shown below:

Col. 9, line 30, "Y-CO-O(A-O)$_m$CO-CR=CH$_2$" should read --Y-CO-O--(-A-O-)$_m$CO-CR=CH$_2$--.

Col. 10, line 20, "HO-C$_n$H$_{2n}$O)$_n$H" should read --HO--(-C$_n$H$_{2n}$O-)$_n$H--.

Signed and Sealed this

Twenty-ninth Day of September, 1992

Attest:

DOUGLAS B. COMER

Attesting Officer     Acting Commissioner of Patents and Trademarks